(12) United States Patent
Hoffman et al.

(10) Patent No.: US 8,436,851 B2
(45) Date of Patent: May 7, 2013

(54) SYSTEMS AND METHODS FOR RENDERING THREE-DIMENSIONAL GRAPHICS IN A MULTI-NODE RENDERING SYSTEM

(75) Inventors: Donley Byron Hoffman, Fort Collins, CO (US); Jeffrey Joel Walls, Fort Collins, CO (US); Byron Alan Alcorn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1623 days.

(21) Appl. No.: 11/051,688

(22) Filed: Feb. 4, 2005

(65) Prior Publication Data
US 2006/0176296 A1 Aug. 10, 2006

(51) Int. Cl.
*G06T 15/00* (2011.01)

(52) U.S. Cl.
USPC .......................................................... 345/419

(58) Field of Classification Search .................. None
See application file for complete search history.

(56) References Cited

U.S. PATENT DOCUMENTS

| | | | | |
|---|---|---|---|---|
| 6,084,553 A * | 7/2000 | Walls et al. | .................... | 715/781 |
| 2003/0164834 A1* | 9/2003 | Lefebvre et al. | ............. | 345/506 |
| 2004/0125111 A1* | 7/2004 | Tang-Petersen et al. | ...... | 345/506 |
| 2004/0174385 A1* | 9/2004 | Ikeda et al. | .................... | 345/629 |
| 2005/0041031 A1* | 2/2005 | Diard | ............................ | 345/505 |

OTHER PUBLICATIONS

"Lightning-2: a high-performance display subsystem for PC clusters", Stoll, G. and Hanrahan, P. and Eldridge, M. and Patterson, D. and Webb, A. and Berman, S. and Levy, R. and Caywood, C. and Taveira, M. and Hunt, S. "Proceedings of the 28th annual conference on Computer graphics and interactive techniques", pp. 141-148, 2001, ACM Press.*
Paper entitled "X-Windows" by Richard Wilkinson, Tessella Support Services PLC, Issue V1.R3.M0, dated Feb. 2003, 10 pages.
Presentation entitled "sv7: Blazing Visualization on a Commodity Cluster" by Byron Alcorn, hp invent, Jul. 2003, 23 pages.

* cited by examiner

*Primary Examiner* — Daniel Hajnik

(57) ABSTRACT

A system is provided for rendering three-dimensional graphics. An embodiment of the system comprises a host capable of executing an application program that calls for the rendering of at least three-dimensional graphics in an application window, and logic associated with the host for apportioning content defining a three-dimensional graphics window to be rendered. The embodiment of the system further comprising a plurality of render nodes configured to collectively render the three-dimensional graphics window in response to the content supplied by the host, and logic associated with a first render node configuring the render node to be capable of rendering only a portion of the three-dimensional graphics window based on apportioned content that the first render node receives from the host and without content comprising a portion of the three-dimensional graphics window apportioned to at least one other of the plurality of render nodes.

20 Claims, 12 Drawing Sheets

SYSTEMS AND METHODS FOR RENDERING THREE-DIMENSIONAL GRAPHICS IN A MULTI-NODE RENDERING SYSTEM

BACKGROUND OF THE INVENTION

The rendering of three-dimensional computer graphics is a computationally intensive process. In many high-end applications, three-dimensional computer graphics are rendered using a pool or cluster of computers, which share the processing responsibilities. In such a system, one computer may be configured to execute at least one application program and communicate graphics data to other computers for rendering. In this regard, a collection of computers may be configured to cooperatively render a graphics image and may receive the graphics data to be rendered from the computer executing the application program.

When multiple computers are used to render a single scene or image, the video signals generated by each of those computers are combined into a single aggregate (or composite) signal and encoded in a particular format, such as NTSC (National Television Standards Committee), PAL (phase alteration by line), etc. There exist devices called compositors that perform the function of combining (or compositing) multiple video signals into a single, composite video signal. Accordingly, there are known approaches for performing the functions of a compositor.

Referring to FIG. 1A, which illustrates an exemplary prior art system, in operation, a host or master computer 110 is configured to execute an application program 112, which generates three-dimensional graphics for presentation to a user. Program control, two-dimensional graphics and windows, user interface functions, and other aspects may be performed on the master or host computer 110. Three-dimensional graphics-rendering operations, however, are performed by a plurality (or cluster) of slave or render nodes 120 (only one render node shown). In such a system, a significant amount of data and other information is communicated from the host or master computer 110 to the render nodes 120 for rendering. As graphics scenes change, windows are moved or resized, or content within the windows is changed, additional communications occur between the host computer 110 and the various render nodes 120 in order to communicate changed information to the render nodes for rendering.

The three-dimensional graphics information is generally communicated to all render nodes 120, providing each render node 120 with state and other information on the other render nodes 120. This, however, consumes excessive bandwidth in the communication of information to all render nodes, as well as consumes excessive memory and processing resources at each render node.

Reference is now made to FIG. 1B, which is a diagram illustrating certain components in the multi-node graphics-rendering system of FIG. 1A. In such a system, application program 112 interacts with both a graphics library 114 and a two-dimensional graphics slave 116. As is known, a graphics-rendering application program often utilizes calls to standardized graphics functions that are maintained within a graphics library 114, and any such graphics calls are processed by the graphics library 114. A two-dimensional graphics slave 116 is also provided for managing the processing of two-dimensional graphics windows. When, however, the application program 112 calls for the rendering of three-dimensional graphics (which three-dimensional graphics are handled by the render nodes 120), any such instructions or graphics calls are routed through the two-dimensional graphics slave 116 to a three-dimensional graphics slave 122, which resides on the render nodes 120. In this respect, the two-dimensional graphics slave 116 acts as a conduit to forward three-dimensional graphics calls and instructions to the three-dimensional graphics slave 122 on the render nodes 120 for processing. A graphics library 124, similar to the graphics library 114, resides at the render node 120 for processing certain three-dimensional graphics calls. In addition, a graphics card (hardware) 125 is provided on each of the render nodes 120. An output of this card (such as a digital video interface) may be directed to a compositor, which is configured to collectively render a graphics display from independent graphics signals received from the various render nodes 120 and host node 110. Communication links or channels 135 and 136 are provided between the host 110 and render nodes 120 to accommodate communications there between.

In operation, an application program may define a number of graphics windows (both two-dimensional and three-dimensional) to be presented on a display. Programs or processes on the host 110 are configured to segregate three-dimensional graphics windows and identify those windows to the render nodes for handling. As the application program 112 (through user interaction or otherwise) calls for a reconfiguration of three-dimensional graphics windows (e.g., window moves, resizes, etc.) then logic provided on the host 110 determines the new configuration of the various three-dimensional graphics windows and communicates that new information to the plurality of render nodes. It should be appreciated that this requires significant resources on each of the render nodes, as well as significant bandwidth utilization through the communications between the host 110 and the plurality of render nodes 120.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Accordingly, there is a desire for systems and methods that provide more efficient three-dimensional graphics rendering.

It should be understood that the embodiments described herein are presented to illustrate certain concepts and features of embodiments of the invention, and the scope and spirit of the present invention should not be construed as limited to only the embodiments described. The term "window" as used herein should be construed in a generic fashion. The term "window" is not intended to be associated with or limited to a screen area that is created or presented under the MICROSOFT WINDOWS operating system. Indeed, as should be appreciated from the description herein, the concepts and teachings of the present invention are applicable to windowing environments in general. Such environments could include a MICROSOFT WINDOWS environment, an X (sometimes referred to as a X Windows) UNIX-based system, or other windowing systems.

Further, the embodiments described herein use the terms "application window" and "graphics window." The term "application window" refers to a rectangular area that is created or defined by an application program running on a host computer. In contrast, the term "graphics window" refers to a sub-window of an application window. In this regard, an application window generally consists of a plurality of graphics windows, which plurality of windows comprise both two-dimensional and three-dimensional graphics windows. Indeed, in the X windowing environment, even the simplest application widows may comprise a number of graphics windows. It is common for an application window to comprise many user interface components (e.g., menus, widgets, decorations, dialogs, and so on) with only a small number of three-dimensional windows.

Figure 2:
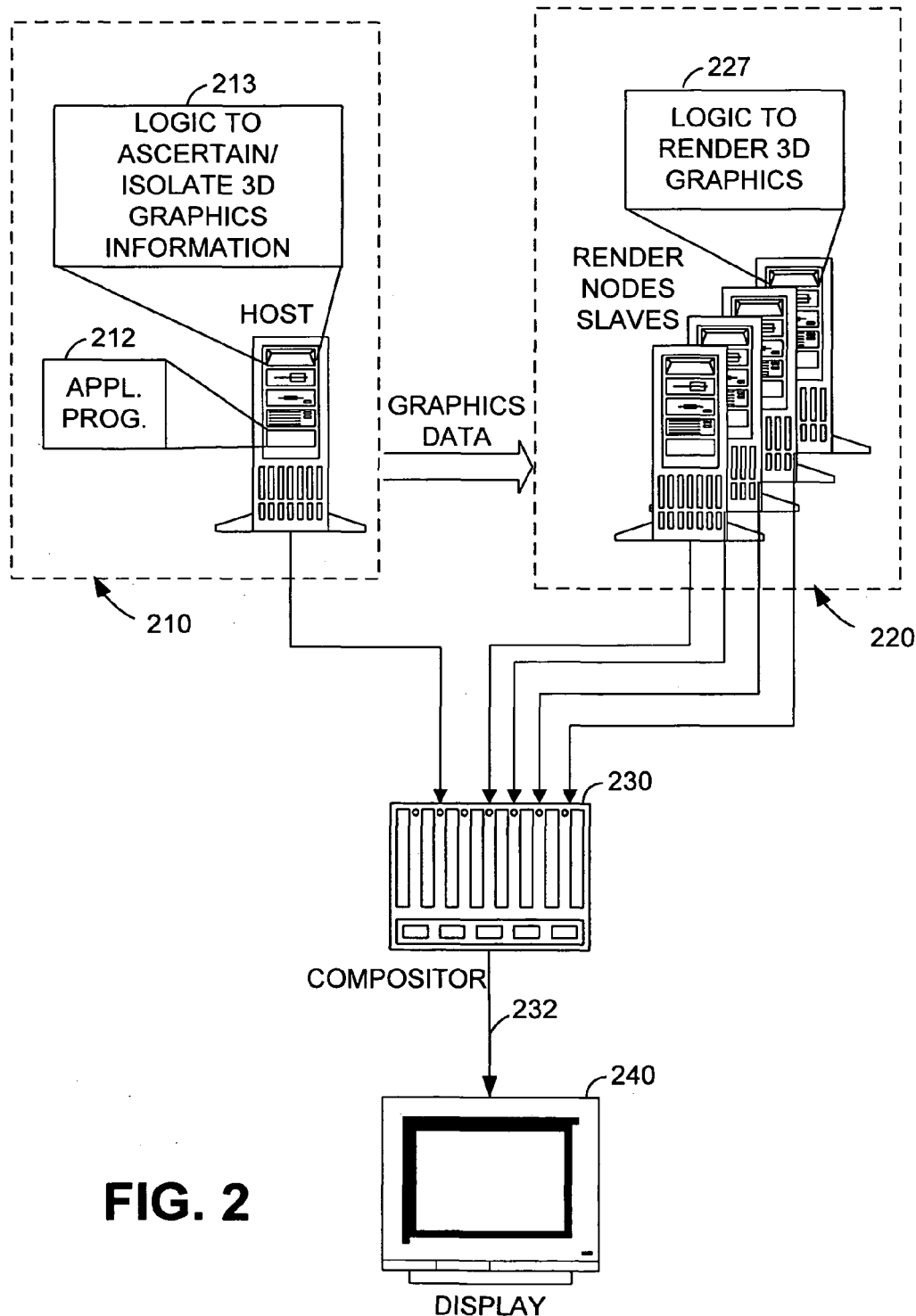
FIG. 2 is a diagram illustrating certain components in a system constructed in accordance with an embodiment of the invention.

With this brief introduction to certain terms that will be used herein, reference is now made to the drawings, in which FIG. 2 illustrates a computing environment in which one embodiment of the present invention resides and operates. Many high-end or intensive graphic programs are executed, and graphics images are rendered, using a plurality of computers in combination. There are various ways in which multiple computers are configured to operate either in parallel or in conjunction to perform a graphics-rendering task. One way is to configure one computer 210 to operate as a master (or host), and configure the remaining plurality of computers 220 to operate as slaves (or render nodes). In the illustrated embodiment, the slave computers 220 are configured to collectively render a three-dimensional graphics image. The rendering among the slave computers 220 is partitioned or allocated in a variety of ways. One way is to partition the screen space into various partitions and have each slave computer render the data associated with its partition. Another way is to partition the graphics data into layers and have each slave 220 render one or more layers.

In the embodiment illustrated in FIG. 2, the master computer 210 executes an application program 212 that involves the rendering of three-dimensional graphics. The control and functionality of the application program 212 is handled by the master computer 210. As well, the master computer 210 handles various two-dimensional graphics rendering that is incidental to the execution of the application program 212. For example, the presentation of drop-down menus or other items of presentation that do not require three-dimensional rendering is performed by the master computer 210. Each of the computers (master computer 210 and each of the slave computers 220) comprises a graphics card (or other graphics circuitry) that outputs a signal for a video display 240. Since, however, the content that is rendered by each of the computers must first be combined, the video outputs of each of the computers are delivered to a compositor 230. A compositor 230 operates to combine the content of each of the plurality of input video signals to deliver a single, composite output signal 232 that is used to drive a display device 240.

Consistent with the scope and spirit of the embodiments described herein, an alternative environment comprises multiple displays 240 that are configured to operate as a single logical display. There are a variety of applications in which graphics information is presented over a panel or matrix of displays, to effectively emulate a single, large display. Examples of such systems include: real estate, financial (such as the stock market), control room, large engineering processes, military mapping, telecommunications, etc. Such systems require the output of large amounts of data, which can easily exceed the viewable display capacity of a single, physical monitor (a user could view relevant data only by panning and zooming).

In a system environment such as that of FIG. 2, the computer 210 executing the graphics application program communicates to the cluster of render nodes 220 the relevant data utilized for carrying out the rendering operations. The structure and content of such data will be known and appreciated by persons skilled in the art, as it is the underlying data specifying primitives, texture, lighting, shading, and other aspects employed for rendering a given graphics image. In one embodiment, such information is communicated by the master 210 to the individual slave computers as appropriate, based upon the partitioned operation of the slave units.

In accordance with an embodiment of the present invention, the host 210 comprises logic 213 for ascertaining and/or isolating information associated with three-dimensional graphics windows and communicating that information to the render nodes. In one embodiment, the three-dimensional graphics information is communicated only to the relevant render nodes (i.e., the render nodes responsible for rendering the portion of the display to which the three-dimensional graphics information pertains). In other embodiments, the three-dimensional graphics information in communicated to all render nodes, so that each render node has relevant information about the other render nodes. The render nodes comprise corresponding logic 227 for receiving the communicated information and rendering the three-dimensional graphics image defined by the information.

Figure 3:
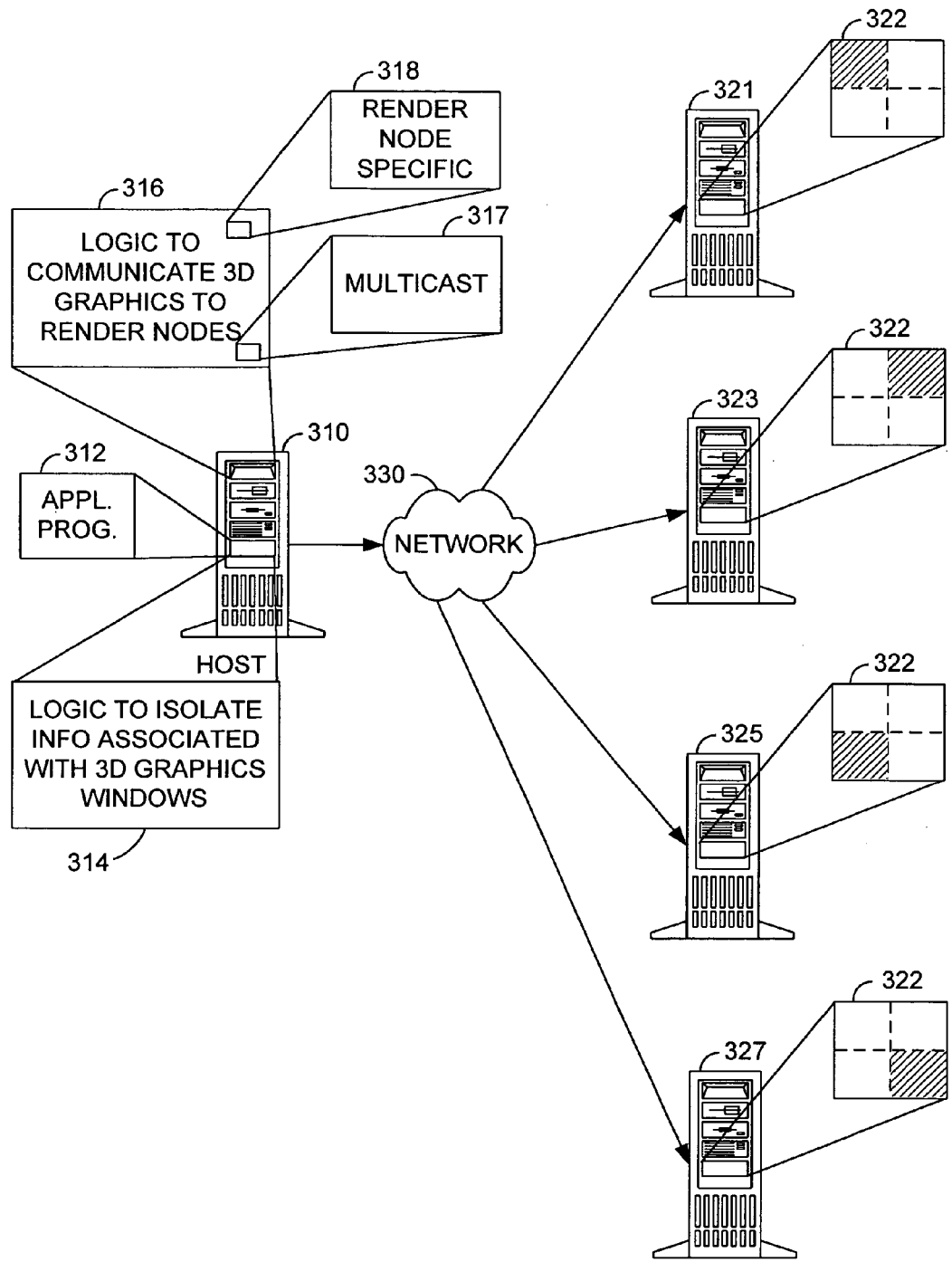
FIG. 3 is a diagram illustrating a screen-space allocation of a four-node render cluster of a system constructed in accordance with an embodiment of the invention.

Reference is now made to FIG. 3, which is a diagram illustrating certain aspects of an embodiment of the present invention. Specifically, FIG. 3 illustrates features pertaining to the host and render nodes, and the compositor and display components have been omitted from this figure for simplicity. In the embodiment illustrated in FIG. 3, a host node 310 is configured to execute an application program 312 that calls for the rendering of three-dimensional graphics. For purposes of illustration herein, consider an application program such as a CAD (computer-aided design) modeling program, that enables a user to design, model, and/or display three-dimensional figures. In addition to the three-dimensional figures or models that may be represented on the display, such an application program also presents menus and other items in 2-D, which do not require three-dimensional rendering.

The embodiment illustrated in FIG. 3 utilizes four render nodes 321, 323, 325, and 327. Of course, consistent with the scope and spirit of the invention, additional or fewer render nodes may be utilized. Further, each render node is allocated or assigned a specific portion of the display 140, such that the graphics image to be rendered is subdivided in screen space and allocated to each of the respective render nodes. In the illustration provided in FIG. 3, render node 321 is allocated (indicated by shading) the upper left quadrant of the display (virtual display represented by reference number 322), render node 323 is allocated the upper right quadrant of the display, render node 325 is allocated the lower left quadrant of the display, and render node 327 is allocated the lower right quadrant of the display.

The host node 310 further comprises logic 314 for identifying and isolating information associated with three-dimensional graphics windows. This "information" comprises information necessary for rendering the content of the three-dimensional graphics window, as well as information defining the size and placement of the three-dimensional graphics window on the display. The manner in which this logic 314 operates, in accordance with one embodiment, is further described in connection with other figures herein. In addition, the host node 310 comprises logic 316 for communicating the information associated with the three-dimensional graphics windows to the render nodes. In one embodiment, the logic 316 comprises logic 318 for mapping the information onto the specific and relevant render nodes and communicating the information to only the render nodes that require the information for performing their rendering operation in the particular quadrant or portion of the display screen allocated to the respective render nodes. In another embodiment, this information may be communicated to all render nodes using, for example, a multicast messaging protocol 317.

As a brief illustration, consider the execution of the application program 312, such that it generates only one three-dimensional graphics window, and further that that three-dimensional graphics window implicates only the top central portion of the display screen. In such an embodiment, only render nodes 321 and 323 are implicated, as render nodes 325 and 327 are responsible for rendering the lower half of the display screen. Therefore, in such a scenario, after the logic 314 identifies and isolates the relevant information for rendering the three-dimensional graphics window, logic 316 communicates that information to render nodes 321 and 323 for rendering. It can be readily appreciated that such an embodiment minimizes unnecessary communications over the network 330 (e.g., no communications to render nodes 325 and 327), and further minimizes unnecessary resource consumption of the various render nodes by providing each render node with only the information needed for its effective operation.

Figure 1A:
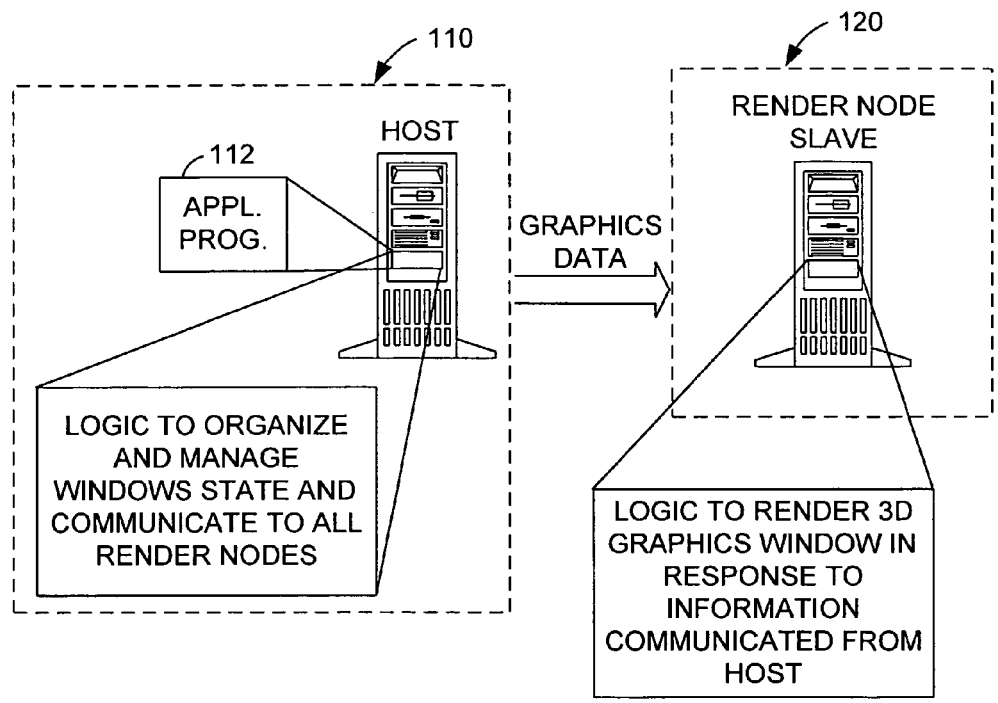
FIG. 1A is diagram illustrating certain components in a multi-node graphics-rendering known in the prior art.
Figure 1B:
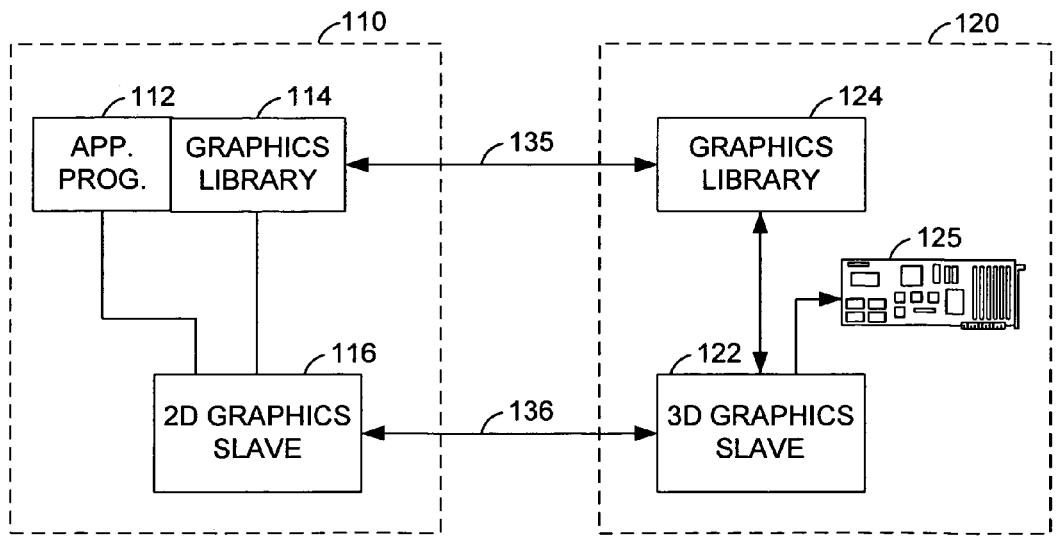
FIG. 1B is a diagram illustrating certain components of the system of FIG. 1A.
Figure 4:
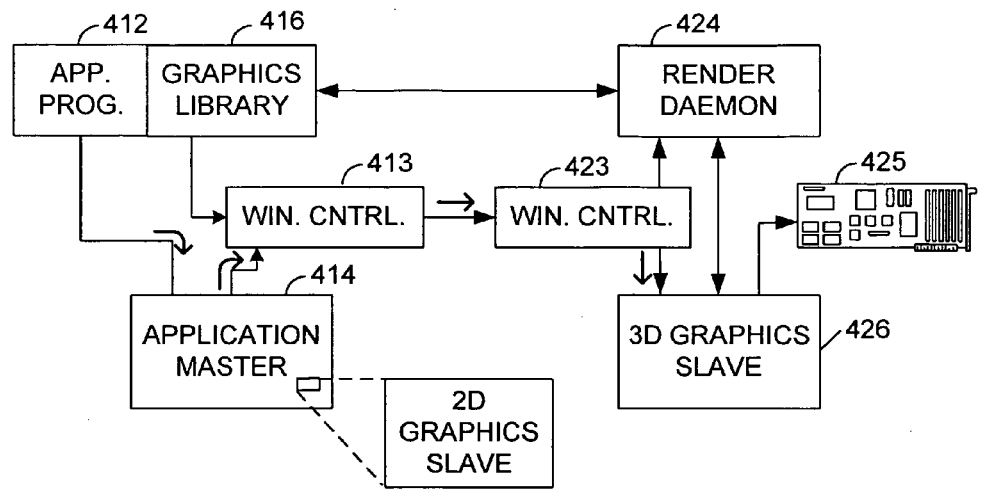
FIG. 4 is a diagram illustrating certain components of an embodiment of the invention.

Reference is now made to FIG. 4, which is a diagram illustrating certain components of an embodiment of the present invention, as contrasted with components of a conventional system, as illustrated in FIG. 1B. In this embodiment, the management of two-dimensional graphics is handled on the host using conventional techniques. However, the management of three-dimensional graphics windows and information is handled in a unique fashion. Window control modules 413 and 423 cooperate with respect to the rendering of three-dimensional graphics. Window control module 413 operates in association with the host, while window control module 423 operates in association with a render node. In operation, the application program 412 calls for the setup of a three-dimensional graphics window. The graphics library 413 identifies relevant calls and communicates them to the window control module 413. In turn, the window control module 413 informs the application master 414, which utilizes a two-dimensional graphics slave to issue a chroma key corresponding to that window, which informs the compositor of the location where the three-dimensional graphics will be placed.

The window control module 413 also communicates defining information for the three-dimensional graphics window to the window control module 423. Window control module 423 instructs the three-dimensional graphics slave 426 with regard to the initialization of the three-dimensional graphics window (at least that portion of the window being handled by the respective render node). The window control module 423 also communicates this window-defining information to the render daemon 424. The render daemon 424 is a process or thread configured for operation on the render node for rendering three-dimensional graphics to the graphics card 425 via the three-dimensional graphics slave 426. In this respect, the render daemon 424 effectively translates graphics (driver-like) commands into commands that can be processed by the graphics driver for rendering and state management three-dimensional graphics slave 426.

As the application program 412 issues calls or instructions that call for the rendering of three-dimensional graphics within a previously-created three-dimensional graphics window, such calls are passed through the graphics library 416 to the render daemon 424. The render daemon 424 carries out the relevant processing on the graphics calls, and executes the appropriate graphics commands on the three-dimensional graphics slave 426.

After creation of a three-dimensional graphics window and the rendering of three-dimensional graphics therein, the application program 412 may call for the reconfiguration of the three-dimensional graphics window (in response to user input or otherwise). Such a window reconfiguration is communicated to the application master 414, which alerts the window control module 413. The window control module 413, in turn, communicates this reconfiguration information to the relevant window control modules 423 of the various render nodes. For example, the system may comprise four render nodes, with each render node being configured to render the three-dimensional graphics in one-fourth of the display area, such that a first render node renders the three-dimensional graphics and the top-left quadrant of the display, a second render node renders the three-dimensional graphics in the top right quadrant of the display, a third render node renders the three-dimensional graphics in the bottom-left quadrant of the display, and a fourth render node renders the three-dimensional graphics in the bottom right quadrant of the display. If a three-dimensional graphics window were originally drawn to a display area completely contained in, for example, the bottom right quadrant of the display, and a re-size operation was performed on that window to enlarge the window such that it impacted both the bottom right and top right quadrants of the display, then the window control module 413 would communicate that reconfiguration information to the two render nodes impacted after the reconfiguration operation is carried out. Thereafter, graphics calls from the application program 412 for the rendering of three-dimensional graphics in that window would be communicated through the graphics library 416 to the render daemons 424 of the two impacted render nodes.

In this embodiment, individual render nodes are configured to render three-dimensional graphics for their respective, allocated portions of the display area, without having to maintain or be supplied with state information (as well as other information) relative to the render operation of other render nodes. It should be appreciated that a system constructed in accordance with the embodiment of FIG. 4 realizes improved bandwidth utilization by reducing communications to render nodes that are not impacted by the rendering of three-dimensional graphics (i.e., those render nodes that are processing portions of a display not impacted by a graphics window). Likewise, the embodiment of FIG. 4 realizes more effective resource utilization at the various render nodes, by eliminating the communication and management of information at various render nodes that are otherwise not impacted by the information (e.g., the two render nodes responsible for processing the left-hand quadrants of the display, in the preceding example).

Figure 5:
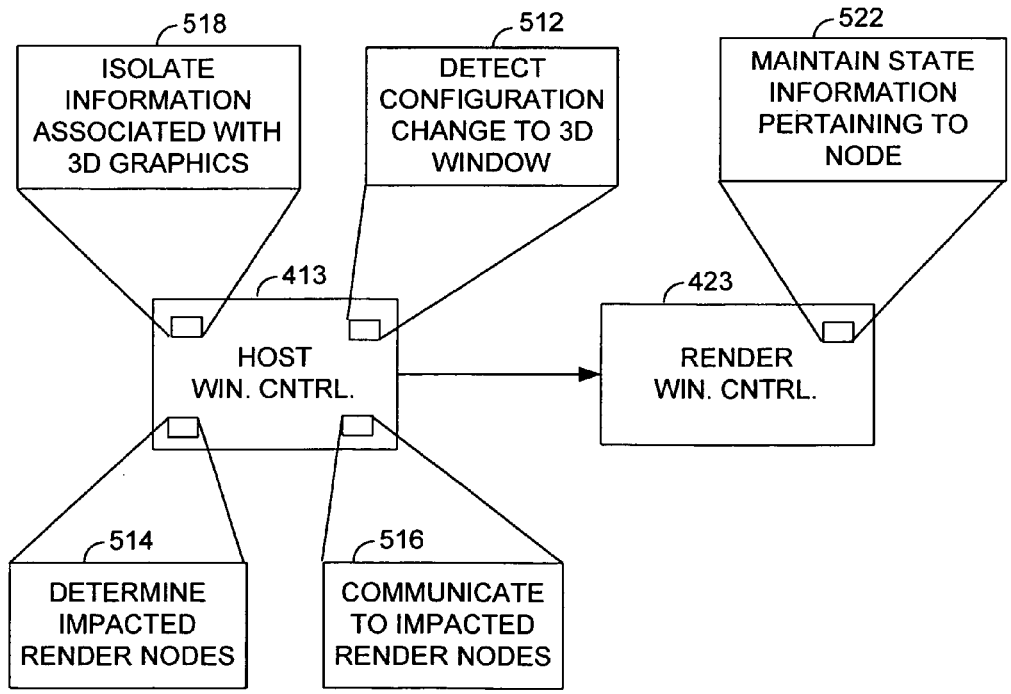
FIG. 5 is a diagram illustrating certain components of an embodiment of the invention.

Reference is now made to FIG. 5, which is a block diagram illustrating certain logic or components that are provided or implemented in an embodiment of the invention. For example, the window control module 413 on the host node comprises logic 512 configured to detect configuration changes to three-dimensional graphics windows. The window control module 413 further comprises logic 514 configured to determine or identify those render nodes that are impacted by the configuration change. The window control module 413 further comprises logic configured to communicate relevant identifying information with regard to the configuration change to the impacted render nodes. Finally, the window control module 413 comprises logic 518 to isolate information associated with three-dimensional graphics. In this regard, logic 518 is utilized in conjunction with the graphics library 416 for communicating content related to or defining three-dimensional graphics to the render daemons 424 of the relevant render nodes.

Likewise, the window control module 423 that is associated with the various render nodes comprises logic 522 for maintaining state information pertaining to the respective render node. As described in connection with FIG. 4, upon creation of an application window that involves one or more three-dimensional graphics windows, defining information pertaining to those three-dimensional graphics windows is communicated to the various, implicated render nodes. The logic 522 that is associated with each of the respective render nodes maintains that state information, and updates this information upon receiving window reconfigure information from the window control module 413.

Figure 6A:
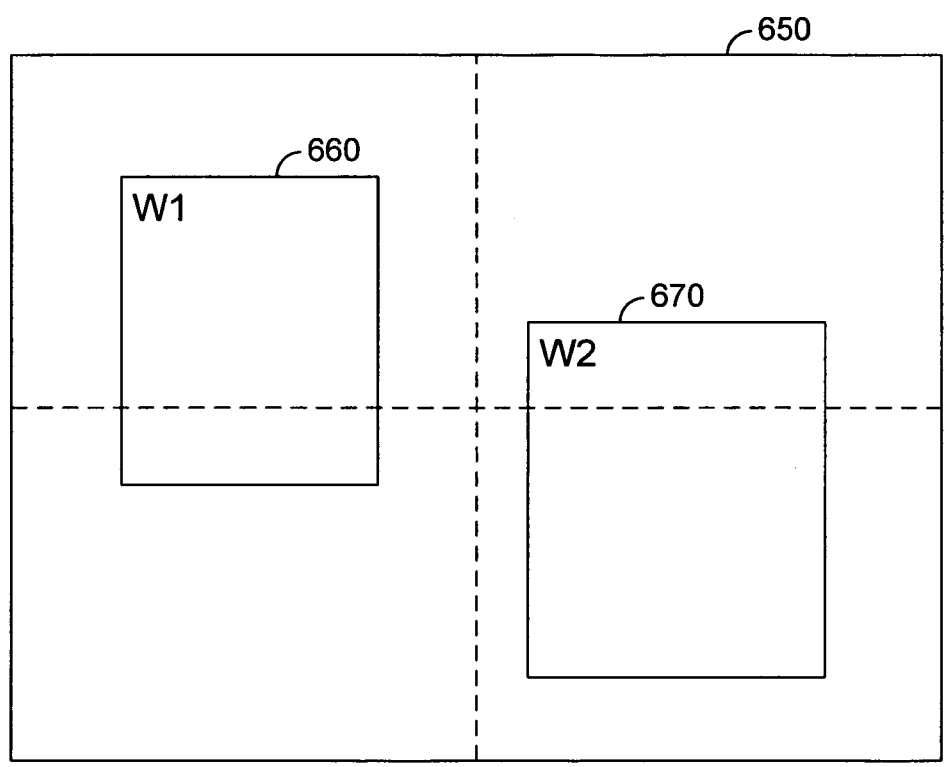
FIGS. 6A, 6B, and 6C are diagrams that illustrate a hierarchical windowing structure, and reduction, implemented in accordance with an embodiment of the invention.
Figure 6B:
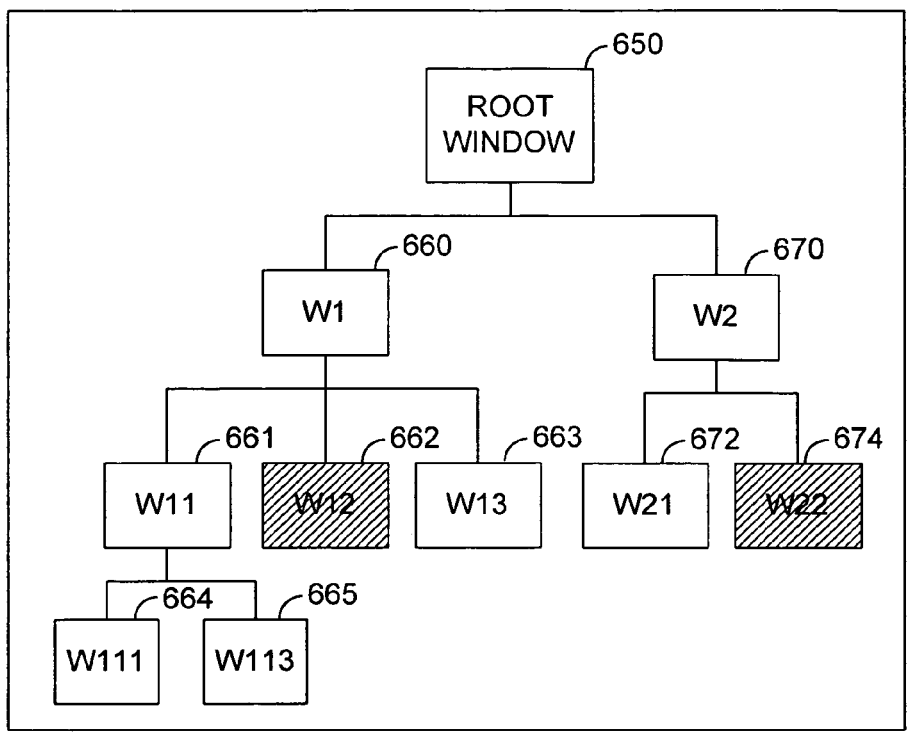
Figure 6C:
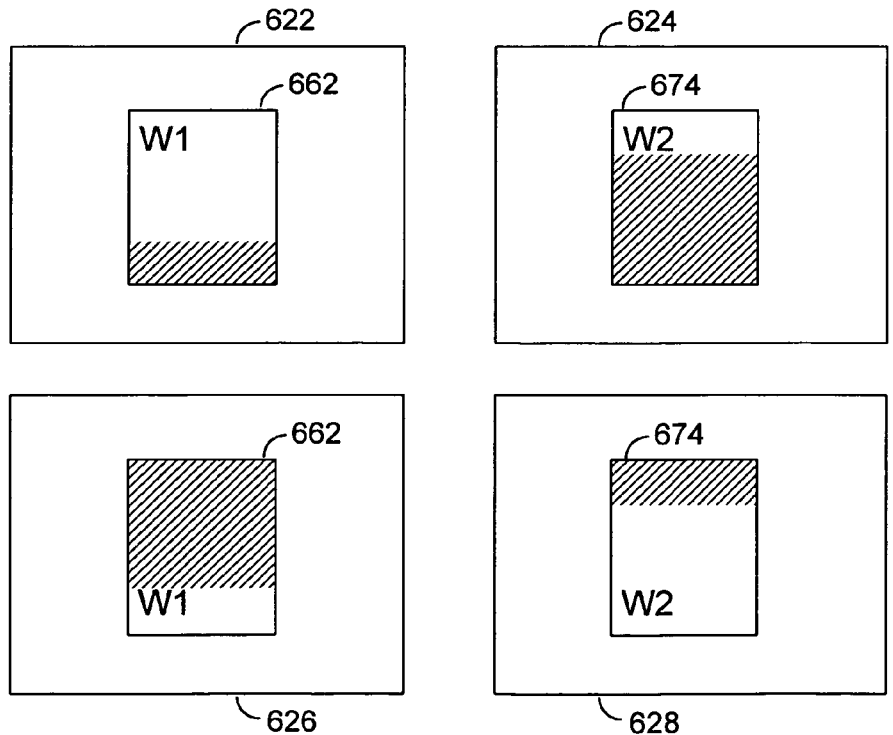

Reference is now made to FIGS. 6A, 6B, and 6C, which are diagrams that provide an illustration of a hierarchical windowing structure utilized by an embodiment to the present invention to effectively organize and isolate two-dimensional and three-dimensional graphics windows. FIG. 6A illustrates an exemplary display 650 for a computer executing an application program that presents two application windows 660 and 670 to a user. Dashed lines are shown bisecting the display 650 both vertically and horizontally, to designate the screen-space allocation of the four exemplary render nodes. As shown, in the illustration, application window 660 spans portions of the upper left and lower left quadrants of the display 650, while application window 670 spans portions of the upper and lower right hand quadrants of the display 650.

FIG. 6B illustrates a hierarchical window tree that partitions each of the application windows 660 and 670 into their constituent two-dimensional and three-dimensional graphics windows components. A hierarchical window tree, such as that presented in FIG. 6B, is generated and maintained at the host node. A root window 650 corresponds to the area of the display. Beneath the root window 650 are sub-windows 660 and 670, which correspond to the application windows presented on the display. Below each application window are the constituent two-dimensional and three-dimensional graphics windows. In the example presented in FIG. 6B, there is a layer of three graphics windows 661, 662, and 663 that comprise the application window 660. In the illustration, graphics windows 661 and 663 are two-dimensional windows, while graphics window 662 (shaded) is a three-dimensional graphics window. Further, due to nesting or other reasons, graphics window 661 is further comprised of subwindows 664 and 665, which are both two-dimensional graphics windows in this illustration. Likewise, application window 670 is illustrated as comprising only two subwindows, which are a two-dimensional graphics window 672 and a three-dimensional graphics window 674. It should be appreciated that the depiction of FIG. 6B is greatly simplified for purposes of illustration herein. As mentioned above, typical application windows comprise a much larger number of sub-component graphics windows (e.g., some comprising as many as several hundred graphics windows). In graphics systems of the prior art, such an entire hierarchical windowing structure is communicated to each and every one of the various render nodes, so that each render node can maintain state information for the entire system. In contrast, and resulting in significant savings of bandwidth and computing resources, an embodiment of the present invention communicates only information associated with three-dimensional graphics windows to the various implicated render nodes. One beneficial aspect relates to the extraction of the relevant information to communicate to the render nodes—and when to communicate it—to keep the pipeline moving smoothly and accurately according to what is represented on the master node. In this regard, the relevant information comprises information needed by a particular render node for rendering its assigned portion of the three-dimensional graphics window. Advantageously, each render node need not be communicated state or other information relevant to other render nodes. Further, with regard to when the information is communicated, such communications take place in response to content or configuration changes that are detected by the host.

FIG. 6C is a diagram illustrating the information that is communicated to the various render nodes, in accordance with an embodiment of the invention. In this regard, as illustrated in FIG. 3, a system having four render nodes is configured such that each render node is responsible for a quadrant of the display area. Reference numbers 622, 624, 626, and 628 are used in FIG. 6C to illustrate the information that is allocated or communicated to the respective render nodes.

Referring to the hierarchical tree of FIG. 6B, graphics window 662 is designated as a three-dimensional graphics window (which is a sub-window of the application window 660). Therefore, the information associated with this window is communicated to the relevant render nodes. With reference to FIG. 6A, the two render nodes that are affected by graphics window 662 are the render nodes responsible for rendering the upper and lower left hand quadrants of the display. Therefore, display areas 622 and 626 (and the corresponding render nodes) receive information relating to graphics window 662. In one embodiment, the content and information associated with graphics window 662 may be entirely communicated to each of the corresponding render nodes. In another embodiment, however, the information associated with graphics window 662 is partially communicated to the render node associated with display area 622 and partially communicated to the render node associated with the display area 626. As illustrated in FIG. 6C, the shaded portions of the windows 662, in display areas 622 and 626, represent the portion of the window 662 that is not needed or utilized by the respective render node for that display area and the unshaded portion represents the portion of the window that is utilized in that associated render node. Likewise, the information associated with graphics window 674 (corresponding to application window 674 of FIG. 6B) is communicated to render nodes associated with display areas of 624 and 628. In one embodiment, the entirety of the information may be communicated to both of the render nodes, while in another embodiment only the information relevant to each respective render node is communicated to that node.

Again, it should be appreciated that the embodiments described herein result in substantial performance increases by substantially reducing bandwidth and system resources required of previous implementations.

Figure 7:
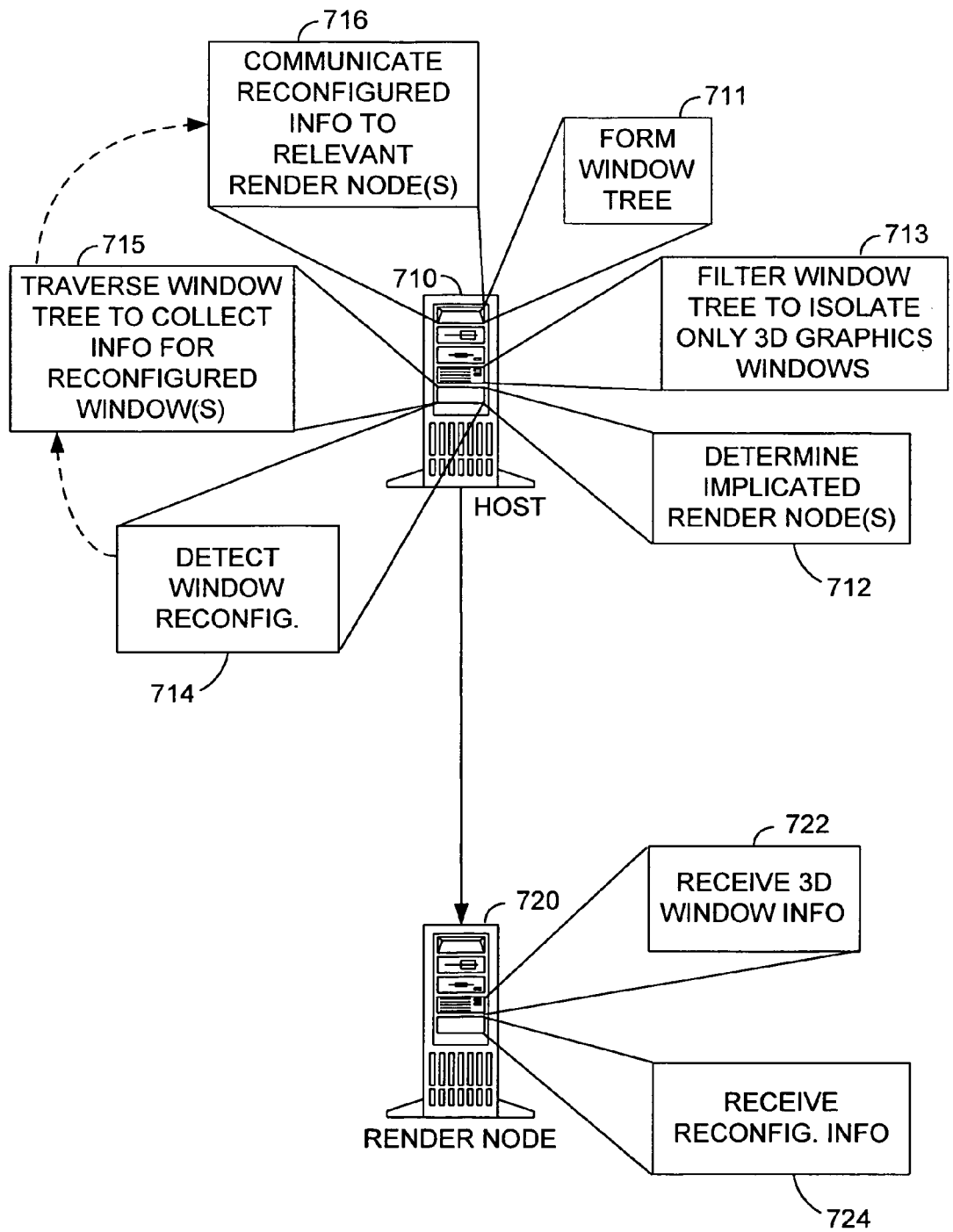
FIG. 7 is a diagram illustrating certain logic components that are implemented on a host computer and render nodes of an embodiment of the present invention.

Reference is now made to FIG. 7, which is a diagram illustrating certain components of an embodiment of the present invention. Principle features of the embodiment reside on host 710. In this regard, host 710 comprises logic 711 configured to form a window tree. As illustrated in FIGS. 6A-6C, the window tree is preferably a hierarchical tree that isolates all sub-windows that comprise the application window(s) to be presented on a display. It should be appreciated that the relevant information could be organized in ways other than a hierarchical window tree, but such a window tree has been used in X windowing systems, and is known. Thus, in the context of various embodiments of invention, the windows may be stored in a variety of ways, so long as the host can determine how the windows are "stacked" (i.e., positioned on the display relative to other windows that may obscure a given window), and how windows are "parented" (i.e., whether three-dimensional windows have three-dimensional children, or sub-windows).

The host 710 further comprises logic 712 to determine which render nodes are implicated by the various graphics windows contained within the window tree. In turn, logic 713 filters the window tree to identify and/or isolate the three-dimensional graphics windows, and further to communicate the associated information of these windows to the relevant or implicated render nodes. It should be appreciated that this alone provides significant performance enhancements of the embodiment over systems known in the prior art. In addition, however, the illustrated embodiment provides additional performance-enhancing features. For example, logic 714 is provided to detect certain window reconfigurations, such as a window move or a window resizing operation; for example, a user clicks on an application window with a mouse to drag the window to another location of the screen, or resize the window. The resizing of such an application window, also results in a resizing of the corresponding three-dimensional graphics window(s). In such situations, where the three-dimensional graphics content has already been processed and rendered, a move or resize operation may be implemented without requiring the render nodes to re-render the entire window.

Instead, a simple BLT (block level transfer) may be performed within the frame buffer or other area of the render nodes to affect a window move operation. Accordingly, logic 715 is provided on the host 710 to traverse the hierarchical tree to collect or revise relevant information for such reconfigured windows. Logic 716 is provided to communicate the relevant information for specifying the reconfiguration to the relevant render nodes. Of course, if an application window is rendered completely in the upper right quadrant of a display, such that it implicates render node 323 (of the embodiment of FIG. 3), and a user then moves that window into the upper left quadrant of the display, then the implicated render node will become render node 321. In one embodiment, the relevant information may be communicated to render node 321, from the host computer such that render node 321 performs a re-rendering operation of the graphics content. In another embodiment, the previously rendered content may be communicated from render node 323 to render node 321, thereby saving render node 321 processing resources associated with the rendering process, as well as graphics-level resources (e.g., texture memory).

Corresponding to the logic components illustrated on host 710, render nodes 720 (only one shown in FIG. 7) comprise logic 722 for receiving information associated with a three-dimensional graphics window. In ways that are known, this information may then be used by the render node for rendering the graphics information to a display area. In addition, the render node 720 comprises logic 721 for receiving reconfiguration information that is communicated from the host 710. This reconfiguration information is utilized by the render node 720 to resize or move previously rendered graphics information within the allocated display area.

Figure 8A:
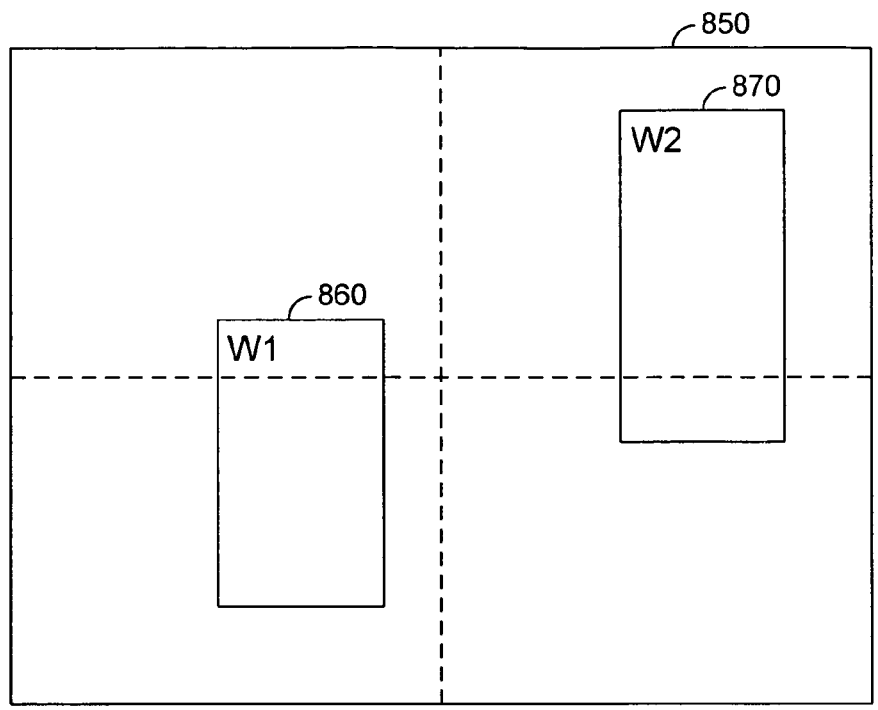
FIGS. 8A, 8B, and 8C illustrate the impact of an exemplary window resize operation, in a display screen, partitioned into four quadrants.
Figure 8B:
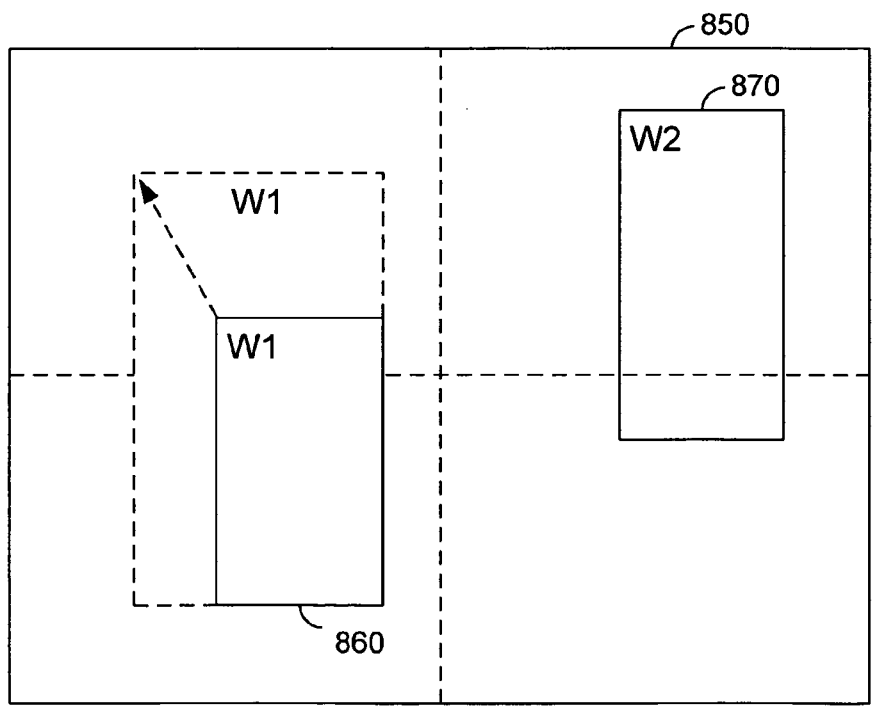
Figure 8C:
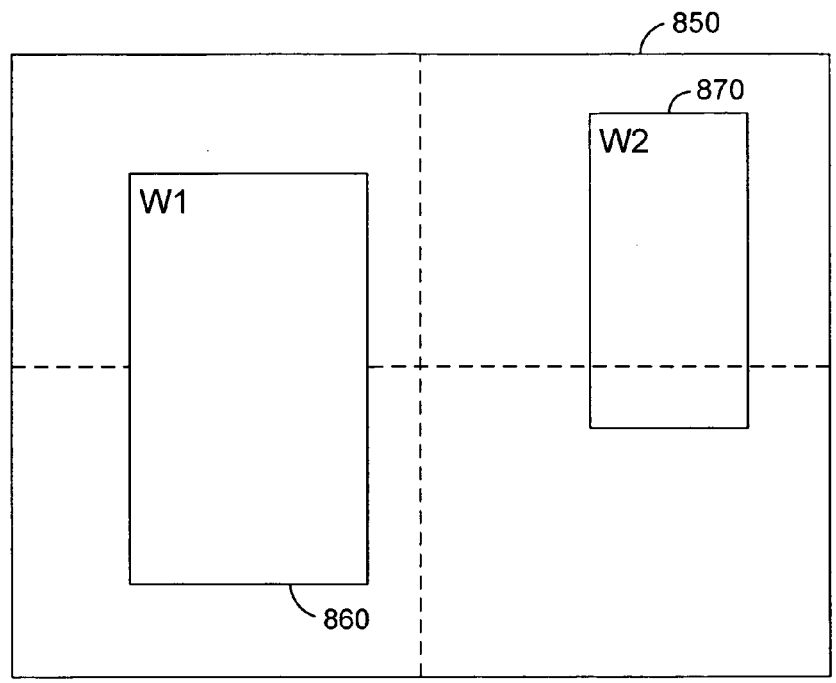

Reference is now made to FIGS. 8A, 8B, and 8C, which illustrate the display of two application windows 860 and 870 within a display area 850 at a given time, FIG. 8A shows an application window 860 that spans the upper and lower left hand quadrants of the display 850. Likewise, a second application window 870 spans the upper and lower quadrants of the right hand side of the display 850. FIG. 8B illustrates a resizing operation of the application window 860 such that it is expanded in size. FIG. 8C, shows the resulting, resized windows 860 and 870.

Figure 9A:
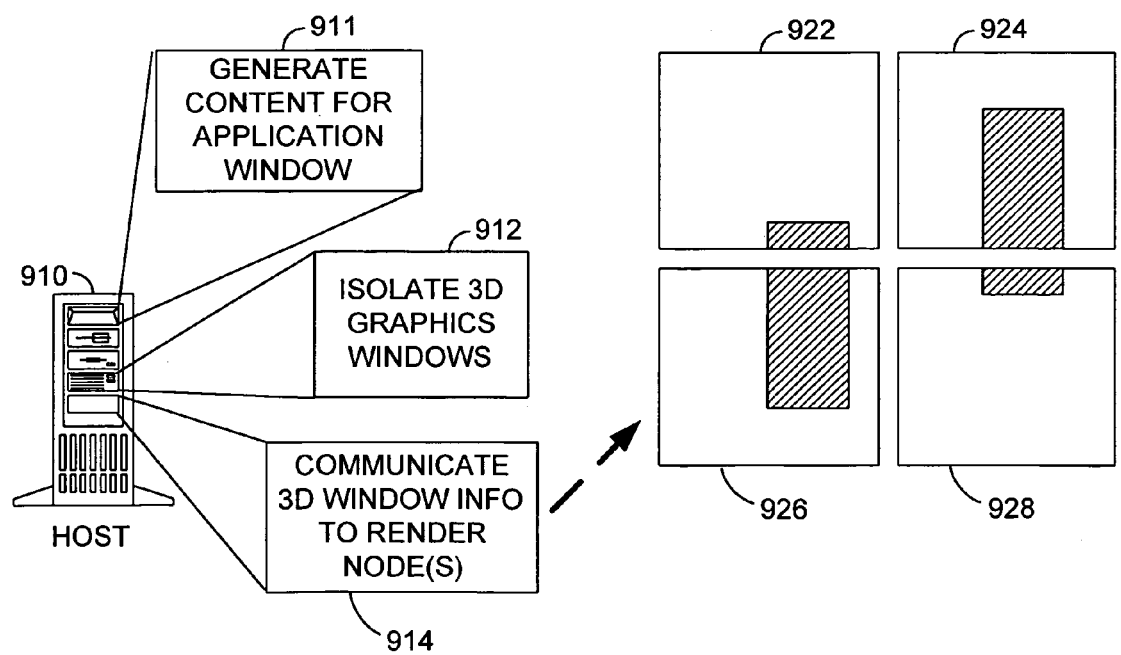
FIGS. 9A, 9B, and 9C are diagrams illustrating operations that take place at a host node and render nodes of a system, constructed in accordance with an embodiment of the invention, corresponding to the windowing operations illustrated in FIGS. 8A, 8B, and 8C.
Figure 9B:
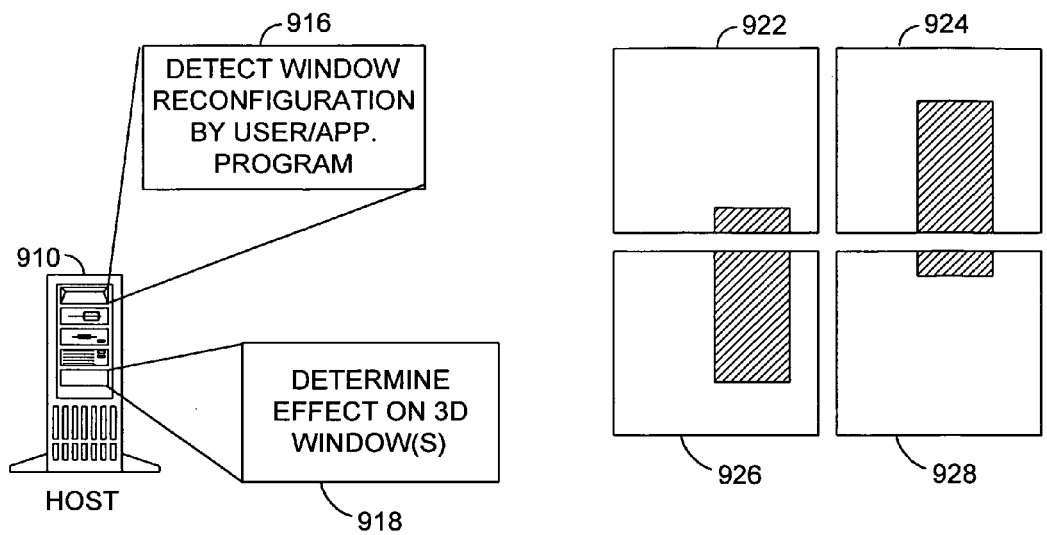
Figure 9C:
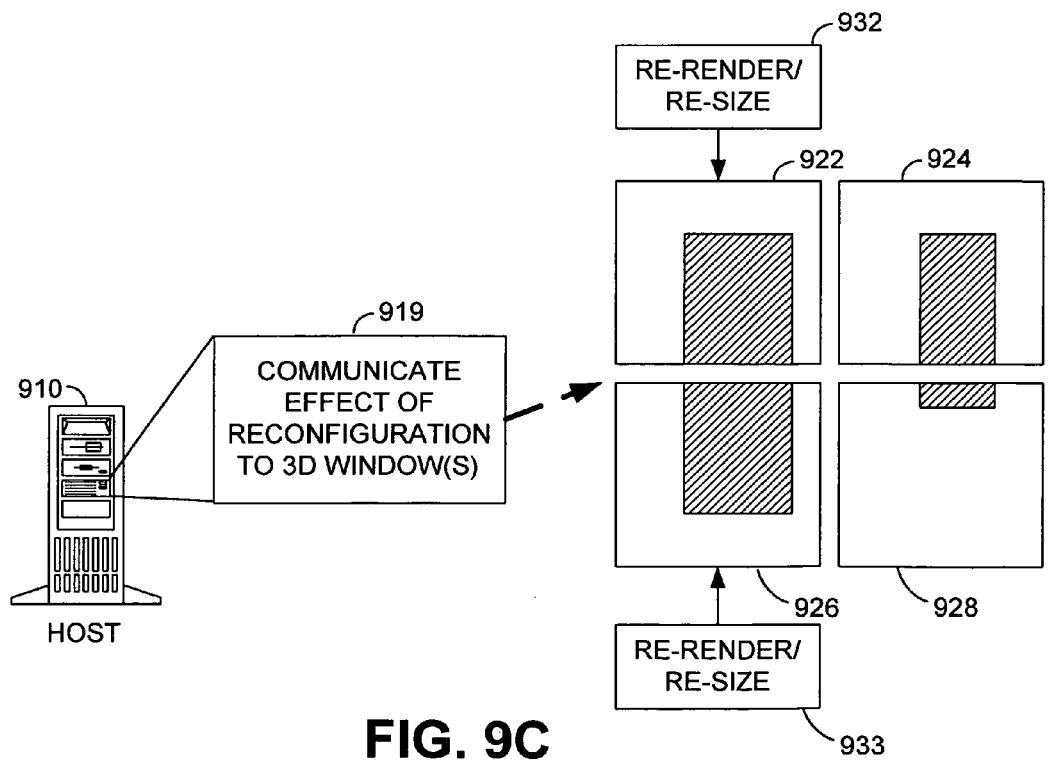

Reference is now made to FIGS. 9A, 9B, and 9C which illustrate resulting operations that take place on the host 910. First, the host, through the execution of an application program, generates content for the application windows (911). Thereafter, the host isolates 3-D graphics windows that are sub-components of the application windows (912). In one embodiment, this isolating of the three graphics windows may be implemented through the utilization of an OpenGL library interface, which, by monitoring calls to the OpenGL library, can determine that an application wants to use a window for three-dimensional rendering. This detection of a three-dimensional window causes the creation of a process or thread to monitor the three-dimensional window on the master node for changes (using the hierarchical window tree, or other window organization).

Thereafter, the host 910 communicates 914 the relevant information for the three-dimensional graphics windows to the corresponding render nodes. Display areas 922, 924, 926, and 928, illustrate the portions of the three-dimensional graphics windows that each is responsible for rendering. In this illustration, for simplicity, the three-dimensional graphics windows are illustrated as comprising effectively the entire size or dimension of the application windows 860 and 870 (of FIGS. 8A-8C). As illustrated in FIG. 9B, as a user or application program causes a window to be reconfigured, the host 910 detects the reconfiguration (916). Thereafter, the host determines the effect of the reconfiguration on the three-dimensional windows (918). Finally, as illustrated in FIG. 9C the host 910 communicates the information relevant to the reconfiguration of the application windows and the relevant three-dimensional graphics windows to the appropriate render nodes (919). As illustrated by reference numerals 932 and 933, the example resize/reconfiguration operation illustrated in FIGS. 8A-8C result in a re-rendering or re-scaling of the windows within display areas 922 and 926. Significantly, there is no change to the information rendered in display areas 924 and 928, and therefore no additional processing is required of the render nodes corresponding to those display areas. With regard to the render nodes responsible for rendering the display areas 922 and 926, it should be appreciated that the particular reconfiguration illustrated in FIG. 8B, does not require any additional content information to be communicated to the render node responsible for display area 926. It does, however, require additional content to be communicated to the render node responsible for display area 922. This information could be communicated from the host computer 910, or alternatively could be communicated directly from the render node responsible for rendering area 926.

In this regard, content information is information generated by an application program that defines a three-dimensional graphics image to be rendered. Therefore, in the embodiment described above, when a window is reconfigured such that at least a portion of the graphics window expands or moves from a display area serviced by one render node into a display area serviced by another window node, then the display of that reconfigured window could be handled in either of a couple of ways. In one embodiment, the host could recommunicate the content information to the render node having the additional window area to be displayed, and that render node could re-render its portion of the graphics window. In an alternative embodiment, the rendered information could be communicated directly between the impacted render nodes.

Figure 10:
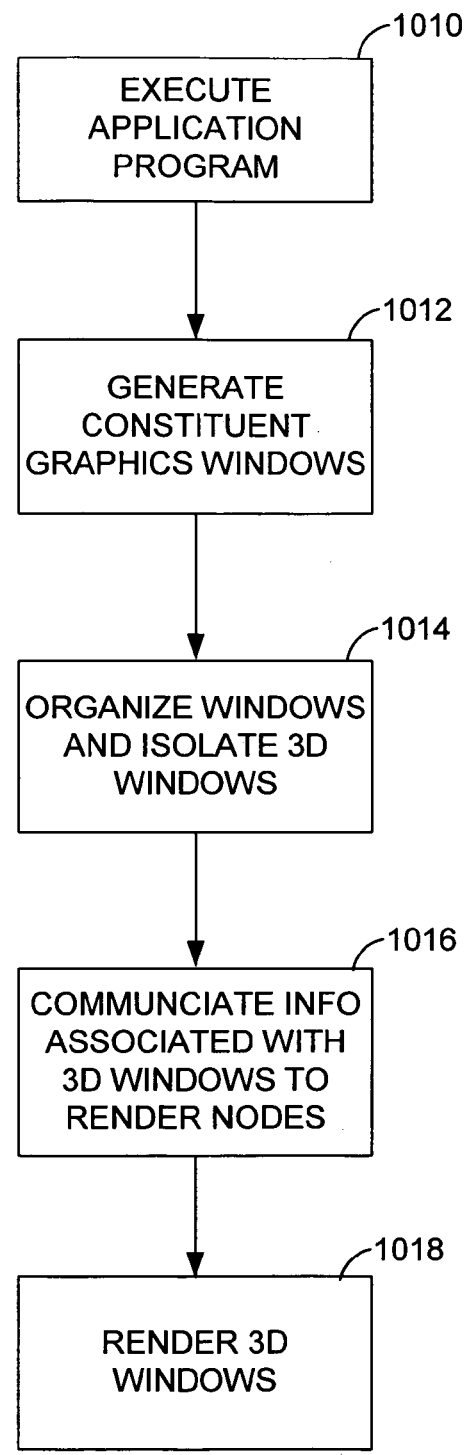
FIG. 10 is a flowchart illustrating the top-level functional operation of an embodiment of the present invention.

Reference is now made to FIG. 10, which is a flow chart illustrating the top-level functional operation of an embodiment of the invention. In accordance with the illustrated embodiment, an application program is executed on a host node that calls for the rendering of three-dimensional graphics in one or more application windows (1010). The method then generates, on the host node, a plurality of constituent graphics windows that collectively comprise the application window (1012). As described herein, these constituent windows comprise both two-dimensional and three-dimensional graphics windows and are designated or identified as such. Further, the constituent windows are organized such that three-dimensional windows, or windows that impact three-dimensional rendering operations, can be readily identified (1014). Thereafter, the information associated with the three-dimensional windows is communicated from the host to the relevant, implicated render nodes for rendering (1016). Finally, the information that is communicated to the render nodes is utilized by the render nodes to collectively render the three-dimensional graphics window(s) (1018).

Figure 11:
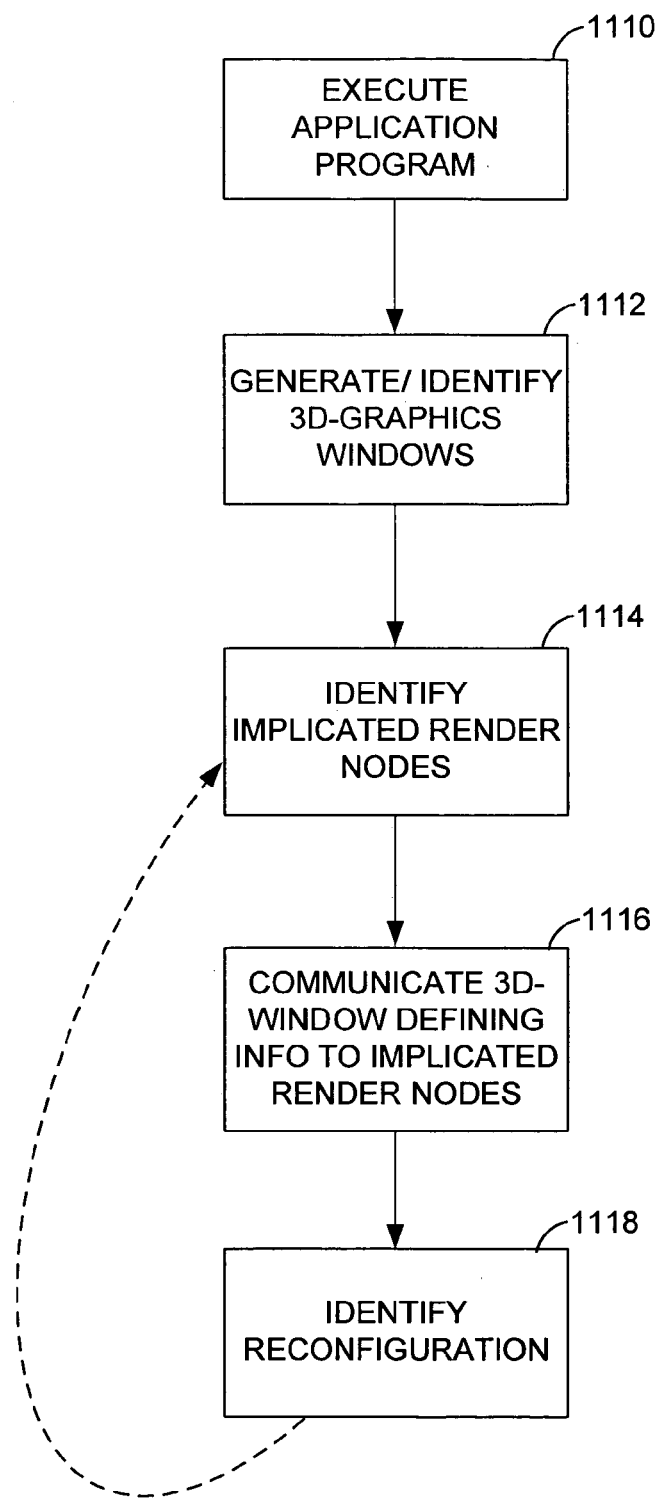
FIG. 11 is a flowchart illustrating the top-level functional operation of an embodiment of the present invention.

Reference is now made to FIG. 11, which is a flow chart illustrating the top-level functional operation of an embodiment of the invention. In accordance with the illustrated embodiment, an application program is executed on a host node that calls for the rendering of three-dimensional graphics in one or more application windows (1110). The method generates and identifies, on the host node, three-dimensional graphics windows, in which three-dimensional graphics will be rendered (1112). As described herein, the method identifies implicated render nodes (1114) and communicates information that defines (e.g., location/position, size, etc.) to the implicated render nodes (1116). Likewise, content to be rendered in a three-dimensional graphics window is thereafter communicated to the implicated render nodes. Finally, the method is capable of identifying a reconfiguration of the three-dimensional graphics window (1118). Thereafter, three-dimensional graphics window content information are communicated to the render nodes implicated by the reconfiguration operation.

What is claimed is:

1. A system for rendering three-dimensional graphics comprising:
    a host capable of executing an application program that calls for the rendering of at least three-dimensional graphics in an application window;
    logic associated with the host for apportioning content between a plurality of render nodes, the content defining a three-dimensional graphics window to be rendered;
    the plurality of render nodes configured to collectively render the three-dimensional graphics window in response to the content supplied by the host;
    logic associated with at least one of the plurality of render nodes for configuring the at least one render node to be capable of rendering only a portion of the three-dimensional graphics window based only on apportioned content that the at least one render node receives from the host, wherein the apportioned content is devoid of image frame data that corresponds to portions of the image that are to be rendered by the other render nodes; and
    a compositor configured to receive outputs from the host and each of the plurality of render nodes, the compositor configured to generate a composite output signal for a display from the received outputs;
    where the logic associated with the host is further configured to communicate reconfiguration information to the plurality of render nodes, in response to detection of a configuration change of the three-dimensional graphics window, without communicating apportioned content.

2. The system of claim 1, further comprising logic for detecting the configuration change in the three-dimensional graphics window.

3. The system of claim 1, wherein the logic associated with the at least one of the plurality of render nodes is configured to be capable of rendering the portion of the three-dimensional graphics window without state information relevant to at least one other of the plurality of render nodes.

4. The system of claim 2, wherein the configuration change comprises one selected from the group consisting of a resize operation and a move operation of the three-dimensional graphics window.

5. The system of claim 1, wherein the logic associated with the at least one of the plurality of render nodes is configured to re-render the portion of the three-dimensional graphics window based on the apportioned content and the reconfiguration information when the detected configuration change includes a configuration change of the portion of the three-dimensional graphics window.

6. The system of claim 2, wherein the logic associated with the host is more specifically configured to communicate to the plurality of render nodes information sufficient to identify only the change associated with the at least one three-dimensional graphics window.

7. In a three-dimensional graphics rendering system, a method comprising:
    executing, on a host node, an application program that calls for the rendering of three-dimensional graphics in an application window;
    apportioning, on the host node, content defining a three-dimensional graphics window to be rendered;
    communicating from the host node to at least one render node of a plurality of render nodes only the content apportioned for the at least one render node;
    rendering, by the at least one render node, a portion of the three-dimensional graphics window in response to the apportioned content communicated from the host node, wherein the apportioned content is devoid of image frame data that corresponds to portions of the image that are to be rendered by the other render nodes, and wherein a remainder of the three-dimensional graphics window is rendered by at least one other of the plurality of render nodes;

generating a single composite signal from outputs from the host node and each of the plurality of render nodes for a display;

detecting a configuration change in the three-dimensional graphics window; and communicating reconfiguration information from the host node to the plurality of render nodes, in response to the detection of the configuration change, without re-communicating the apportioned content.

8. The method of claim 7, wherein the rendering is capable of rendering the portion of the three-dimensional graphics window without state information relevant to at least one other of the plurality of render nodes.

9. The method of claim 7, further comprising re-rendering, by the at least one render node, the portion of the three-dimensional graphics window based on the apportioned content and the reconfiguration information in response to the reconfiguration information, when the at least one render node is implicated by in the configuration change.

10. The method of claim 9, wherein the re-rendering is based on the apportioned content communicated from the host node and apportioned content received from at least one other render node.

11. The system of claim 7, wherein the reconfiguration information is communicated only to implicated render nodes.

12. A system for rendering three-dimensional graphics comprising:
a host capable of executing an application program that calls for the rendering of at least one three-dimensional graphics window as a part of an application window;
a plurality of render nodes configured to collectively render the at least one three-dimensional graphics window from graphics content communicated from the host;
logic associated with the host for identifying a reconfiguration operation to at least one three-dimensional graphics window and for communicating information identifying the reconfiguration operation to only implicated render nodes, and not to render nodes that are not implicated by the reconfiguration operation;
logic associated with the plurality of render nodes for re-rendering the at least one three-dimensional graphics window from the graphics content based on the communicated reconfiguration information.

13. The system of claim 12, wherein the logic associated with the plurality of render nodes is further configured to re-render the at least one three-dimensional graphics window without requiring a recommunication of the graphics content from the host to those render nodes implicated to render a greater portion of the at least one three-dimensional graphics than that which was rendered before the reconfiguration operation.

14. The system of claim 12, wherein the logic associated with the plurality of render nodes is further configured to re-render the at least one three-dimensional graphics window without requiring a recommunication of the graphics content from the host.

15. The system of claim 14, wherein the logic associated with the plurality of render nodes configures the render nodes to communicate directly to other render nodes, in response to an identified reconfiguration operation, information relating to the three-dimensional graphics window regarding the movement of a portion of the graphics window from one render node to another render node.

16. The system of claim 12, wherein the logic associated with the host is specifically configured to communicate configuration information to the plurality of render nodes, in response to the detection of a configuration change, without re-communicating the graphics content to the plurality of render nodes.

17. A system for rendering three-dimensional graphics comprising:
means for executing an application program that calls for the rendering of at least three-dimensional graphics in an application window;
means for rendering a three-dimensional graphics window in response to content supplied by the means for executing, the content defining the three-dimensional graphics window to be rendered;
means for apportioning the content among parts of the means for rendering that are configured to collectively render the three-dimensional graphics window;
means for configuring at least one part of the means for rendering to be capable of rendering only a portion of the three-dimensional graphics window based on only apportioned content that the at least one part of the means for rendering receives from the means for executing, wherein the apportioned content is without any of the content comprising a portion of the three-dimensional graphics window apportioned to other parts of the means for rendering; and
means for generating a composite signal for display from outputs received from the means for executing the application program and the means for rendering;
where the means for executing the application program is further configured to:
detect a configuration change in the three-dimensional graphics window, and
communicate information identifying the configuration change to the means for rendering, in response to detecting the configuration change.

18. A system of claim 17, wherein the information identifying the configuration change is communicated to only parts of the means for rendering implicated by the configuration change, and not to parts of the means for rendering that are not implicated by the configuration change.

19. A system of claim 18, wherein the at least one part of the means for rendering is implicated and, in response to the information identifying the configuration change, re-renders the portion of the three-dimensional graphics window from the apportioned content received from the means for executing.

20. The system of claim 5, wherein the re-rendering is further based on apportioned content received from at least one other render node.

* * * * *